(12) United States Patent
Cohen et al.

(10) Patent No.: US 7,050,396 B1
(45) Date of Patent: May 23, 2006

(54) METHOD AND APPARATUS FOR AUTOMATICALLY ESTABLISHING BI-DIRECTIONAL DIFFERENTIATED SERVICES TREATMENT OF FLOWS IN A NETWORK

(75) Inventors: Ron Cohen, San Jose, CA (US); Yoram Snir, San Jose, CA (US); John Schnizlein, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 750 days.

(21) Appl. No.: 09/729,623

(22) Filed: Nov. 30, 2000

(51) Int. Cl.
*H04L 1/00* (2006.01)

(52) U.S. Cl. .................. 370/235; 370/392; 709/228

(58) Field of Classification Search ............. 370/389, 370/392, 235, 400, 236; 709/238, 228
See application file for complete search history.

(56) References Cited

U.S. PATENT DOCUMENTS

| | | | |
|---|---|---|---|
| 5,359,593 A | 10/1994 | Derby et al. | |
| 5,594,792 A | 1/1997 | Chouraki et al. | |
| 5,928,331 A | 7/1999 | Bushmitch | |
| 5,968,176 A | 10/1999 | Nessett et al. | |
| 5,970,064 A | 10/1999 | Clark et al. | |
| 6,009,081 A | 12/1999 | Wheeler et al. | |
| 6,021,263 A | 2/2000 | Kujoory et al. | |
| 6,021,439 A | 2/2000 | Turek et al. | |
| 6,028,842 A | 2/2000 | Chapman et al. | |
| 6,046,980 A | 4/2000 | Packer | |
| 6,047,322 A | 4/2000 | Vaid et al. | |
| 6,061,725 A | 5/2000 | Schwaller et al. | |
| 6,104,700 A | 8/2000 | Haddock et al. | |
| 6,118,760 A | 9/2000 | Zaumen et al. | |
| 6,154,776 A | 11/2000 | Martin | |
| 6,167,445 A | 12/2000 | Gai et al. | |
| 6,169,748 B1 | 1/2001 | Barbas et al. | |
| 6,170,009 B1 | 1/2001 | Mandal et al. | |
| 6,212,184 B1 | 4/2001 | Venkatachary et al. | |
| 6,286,052 B1 | 9/2001 | McCloghrie et al. | |
| 6,301,253 B1 | 10/2001 | Ichikawa | |
| 6,301,613 B1 | 10/2001 | Ahlstrom et al. | |
| 6,324,184 B1 | 11/2001 | Hou et al. | |
| 6,327,618 B1 | 12/2001 | Ahlstrom et al. | |
| 6,363,429 B1 | 3/2002 | Ketcham | |
| 6,393,473 B1 | 5/2002 | Chu | |
| 6,401,240 B1 | 6/2002 | Summers | |
| 6,424,659 B1 | 7/2002 | Viswanadham et al. | |
| 6,430,154 B1 * | 8/2002 | Hunt et al. ............... 370/230.1 |
| 6,434,624 B1 * | 8/2002 | Gai et al. .................... 709/232 |
| 6,442,151 B1 | 8/2002 | H'mimy et al. | |

(Continued)

*Primary Examiner*—Ricky Ngo
*Assistant Examiner*—Nittaya Juntima
(74) *Attorney, Agent, or Firm*—Hickman Palermo Truong & Becker, LLP

(57) ABSTRACT

A method of automatically establishing differentiated services quality of service treatment for a return packet flow that is associated with an originating packet flow in a network is disclosed. The originating packet flow is received, and it is determined that one or more packets in the originating packet flow are marked with a DSCP value that matches a policy rule that instruct setting of a specified DSCP value to the return packet flow. In response, information identifying the originating packet flow and a second DSCP value for marking the return packet flow is created and stored. When a corresponding return packet flow is received and determined to be associated with the originating packet flow, packets of the return packet flow are automatically marked with the second DSCP value. Once the packet flow terminates, all stored information is removed.

29 Claims, 5 Drawing Sheets

U.S. PATENT DOCUMENTS

| | | |
|---|---|---|
| 6,449,255 B1 | 9/2002 | Waclawsky |
| 6,453,351 B1 | 9/2002 | Endo |
| 6,459,682 B1 | 10/2002 | Ellesson et al. |
| 6,463,470 B1 | 10/2002 | Mohaban et al. |
| 6,466,984 B1 * | 10/2002 | Naveh et al. ............... 709/228 |
| 6,473,793 B1 | 10/2002 | Dillon et al. |
| 6,483,805 B1 * | 11/2002 | Davies et al. ............... 370/235 |
| 6,484,261 B1 | 11/2002 | Wiegel |
| 6,539,425 B1 | 3/2003 | Stevens et al. |
| 6,570,851 B1 * | 5/2003 | Koskelainen et al. ....... 370/231 |
| 6,570,875 B1 | 5/2003 | Hegde |
| 6,577,644 B1 * | 6/2003 | Chuah et al. ............... 370/466 |
| 6,587,433 B1 * | 7/2003 | Borella et al. ............... 370/230 |
| 6,594,268 B1 | 7/2003 | Aukia et al. |
| 6,601,082 B1 | 7/2003 | Durham et al. |
| 6,611,864 B1 | 8/2003 | Putzolu et al. |
| 6,621,793 B1 | 9/2003 | Widegren et al. |
| 6,622,170 B1 | 9/2003 | Harrison et al. |
| 6,650,644 B1 | 11/2003 | Colley et al. |
| 6,651,191 B1 | 11/2003 | Vacante et al. |
| 6,671,724 B1 | 12/2003 | Pandya et al. |
| 6,684,244 B1 | 1/2004 | Goldman et al. |
| 6,765,873 B1 | 7/2004 | Fichou et al. |

* cited by examiner

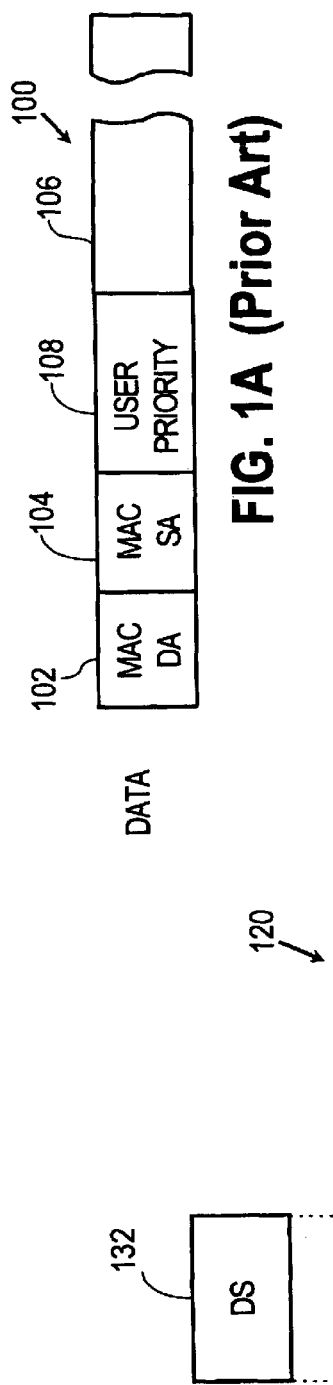
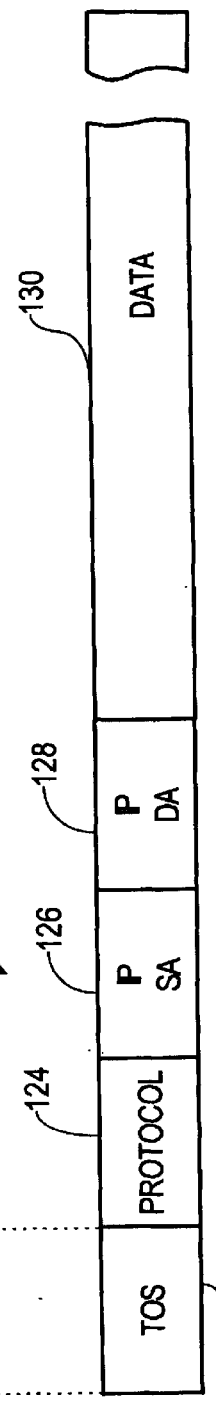
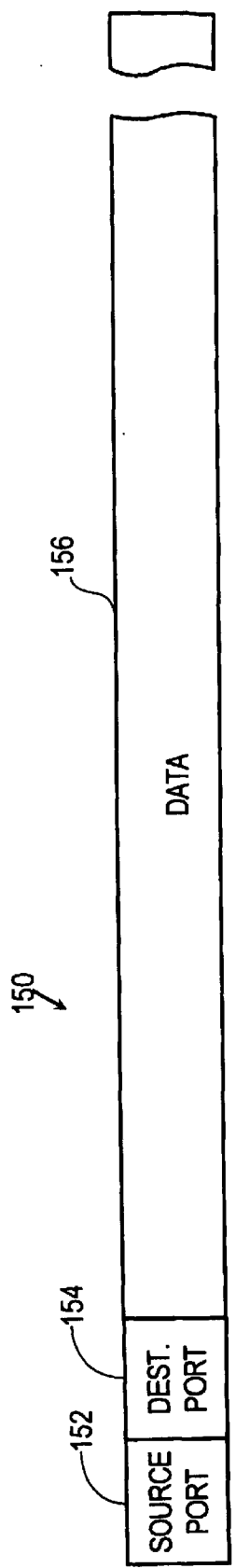

METHOD AND APPARATUS FOR AUTOMATICALLY ESTABLISHING BI-DIRECTIONAL DIFFERENTIATED SERVICES TREATMENT OF FLOWS IN A NETWORK

FIELD OF INVENTION

The present invention generally relates to applying quality of service treatment to information that is transmitted in a packet-switched network. The invention relates more specifically to a method and apparatus for automatically establishing bi-directional differentiated services treatment of flows in a network.

BACKGROUND OF THE INVENTION

Packet Processing in a Network

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork generally known as the Internet or World Wide Web (WWW).

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP, which is a reliable, connectionoriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are stripped off, thereby recovering the original message that is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2, which in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. Conventionally, IP data packets include a corresponding header that contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Allocation of Network Resources

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. In particular, the network administrator may want a stock quote message to be given higher priority than a print transaction. Similarly, a $1 million stock transaction message for a premium client should be assigned higher priority than a $100 stock transaction message for a standard customer.

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Additionally, the intermediate devices also include specific resources or services, such as a particular number of buffers or priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard.

FIG. 1A is a partial block diagram of a Data Link frame 100 that includes a MAC destination address (DA) field 102, a MAC source address (SA) field 104 and a data field 106. For clarity, FIG. 1A shows only fields of interest within the header portions of the frame. According to the 802.1Q standard, a user_priority field 108, among others, is inserted after the MAC SA field 104. The user_riority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet 120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet.

FIG. 1C is a partial block diagram of a Transport Layer packet 150 that preferably includes a source port field 152, a destination port field 154, and a data field 156, among others. Fields 152, 154 preferably are loaded with the TCP or UDP port numbers that are utilized by corresponding network entities.

Differentiated Services

Currently, a Differentiated Services (DS) architecture is under development by the Internet Differentiated Services Working Group of the Internet Engineering Task Force (IETF). The main idea behind DS is the classification and possibly conditioning of traffic at network boundaries. The classification operation entails the assignment of network traffic to behavioral aggregates. The behavioral aggregates define a collection of packets with common characteristics that determine how they are identified and treated by the network.

To achieve the classification, the Internet Differentiated Services Working Group has proposed replacing the ToS field 122 of Network Layer packets 120 with a one-octet differentiated services (DS) field 132, which is assigned a differentiated services codepoint (DSCP) value between "0" and "63". Additional information about such classification is set forth in RFC 2474, "Definition of the Differentiated Services Field in the IPv4 and IPv6 Headers". Layer 3 devices that are DS compliant ("DS nodes") apply a particular per-hop forwarding behavior to data packets based on the contents of their DS fields 132. This mechanism provides a method for dividing or allocating bandwidth of a network between the different flows, and is generally referred to as the per-hop-behavior (PHB). Examples of per-hop forwarding behaviors include expedited forwarding (EF) and assured forwarding (AF). Additional information on AF and EF can be found in RFC 2597 and RFC 2598.

In a typical differentiated services environment, DS nodes located at the border of the DS domain ("edge devices") mark or "color" each IP packet for a particular flow with a specific DSCP value based on the currently established QoS policies. Such coloring may involve loading the DS field 132 of a packet with a particular DSCP value. Thereafter, the interior DS compliant devices along the path apply the corresponding forwarding behavior to the packet based on the particular DSCP value.

For example, a QoS policy typically includes a filter or Boolean expression that indicates which packets are to be colored, and with what DSCP values. For example, a network administrator may configure its network to run three per hop behaviors end to end, such as Best Effort (BE), Expedited forwarding (EF) and a PHB behavior for background traffic that can be named "less than best effort'" (LBE). The network administrator can now select a QoS policy that colors all Voice Over IP (VOIP) packets with the standard DSCP value for the EF PHB and marks all email packets with the DSCP value used to indicate a LBE per hop forwarding behavior.

Deficiencies of Current Approaches

Certain applications require the network to guarantee a particular quality of service treatment for all traffic flow in both directions between a pair of end nodes. When the desired QoS treatment involves use of the Differentiated services model, either both end nodes are required to set the appropriate DSCP value for the packets they send, or both end nodes are required to rely on the edge network nodes to set the DSCP values in both directions. In some network environments, the end nodes are not trusted to set the right DSCP, and edge network nodes must perform all DSCP setting operations. In simple scenarios, it is possible to configure the edge nodes in advance to perform the bi-directional DSCP setting. This can be done only if the relevant end nodes and the traffic characteristics of the flows running between them are known in advance. In more complex scenarios, specification of rules on edge network nodes becomes cumbersome, inefficient and may require a lot of topology knowledge from the policy management system.

For example, consider a network environment in which one quality of service policy is to provide one user, "John Smith," an enhanced QoS service for all flows associated with him. Under the policy, such enhanced service traffic is marked with a DSCP value of "17." "John Smith" may log on to the network using any end station and therefore the location and IP address of the end station cannot be determined in advance, requiring a dynamic configuration of the network in order to provide "John Smith" with the appropriate QoS guarantee. When the user logs into the network, using conventional means a policy server can determine the network interface (port) to which the user is connected. This allows the policy system to set a rule that marks all flows sent via this port with a DSCP value of "17," resulting in a QoS guarantee for all flows sent by "John Smith."

However, in one past approach, to provide QoS for the traffic flowing back to "John Smith," coloring instructions or rules are required to be dynamically set at all possible network edge points with which "John Smith" may communicate. In a large network, this involves creating and storing a large number of rules and communicating them to numerous devices, which is impractical. Further, such an approach is wasteful in terms of using system resources. For example, even if such rules are set only at the network edge devices that are positioned at entry points to large server farms, the approach may require allocation of resources at the edge devices that "John Smith" never uses during a session. Setting the policy rules may require the policy management system to expend too much bandwidth and time.

Based on the foregoing, there is a clear need for a way to carry out policy setting to arrive at a bi-directional QoS guarantee.

In particular, there is a need to ensure that traffic returning to a user has the same QoS treatment as traffic originated by that user, without requiring the user to always use a particular machine or device.

Further, there is a need for a way to create a bi-directional QoS guarantee, while consuming classification and policing resources only in the network nodes that are actually visited by traffic that requires a bi-directional QoS guarantee.

There is also a need for such an approach that does not require the node that implements the approach to have extensive information about network topology.

SUMMARY OF THE INVENTION

The foregoing needs, and other needs and objects that will become apparent for the following description, are achieved in the present invention, which comprises, in one aspect, a method of automatically establishing differentiated services quality of service treatment for a return packet flow that is associated with an originating packet flow in a network is provided. The originating packet flow is received, and it is determined that one or more packets in the originating packet flow are marked with a first DSCP value that includes a request for application of the same quality of service treatment to the return packet flow. In response, information identifying the originating packet flow and a second DSCP value for marking the return packet flow is created and stored. When a corresponding return packet flow is received and determined to be associated with the originating packet flow, packets of the return packet flow are automatically marked with the second DSCP value.

According to one feature, the information identifying the originating packet flow and the second DSCP value are created and stored in a flow table of a network switch that is acting as a policy enforcement point. In another feature, the information identifying the originating packet flow and the second DSCP value are created and stored in a network-based application recognition table of a network switch that is acting as a policy enforcement point.

In one specific embodiment, the method is carried out at a switch device that is logically located at an edge point of a network.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a partial block diagram of a network message.

FIG. 1B is a partial block diagram of a network message.

FIG. 1C is a partial block diagram of a network message.

DETAILED DESCRIPTION OF THE PREFERRED EMBODIMENT

A method is disclosed for automatically establishing bi-directional differentiated services treatment of flows in a network. In one embodiment, a method automatically applies bi-directional quality of service treatment under the Differentiated services model to packet flows of voice information that are transmitted among a pair of endpoint nodes in a packet-switched network.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 2:
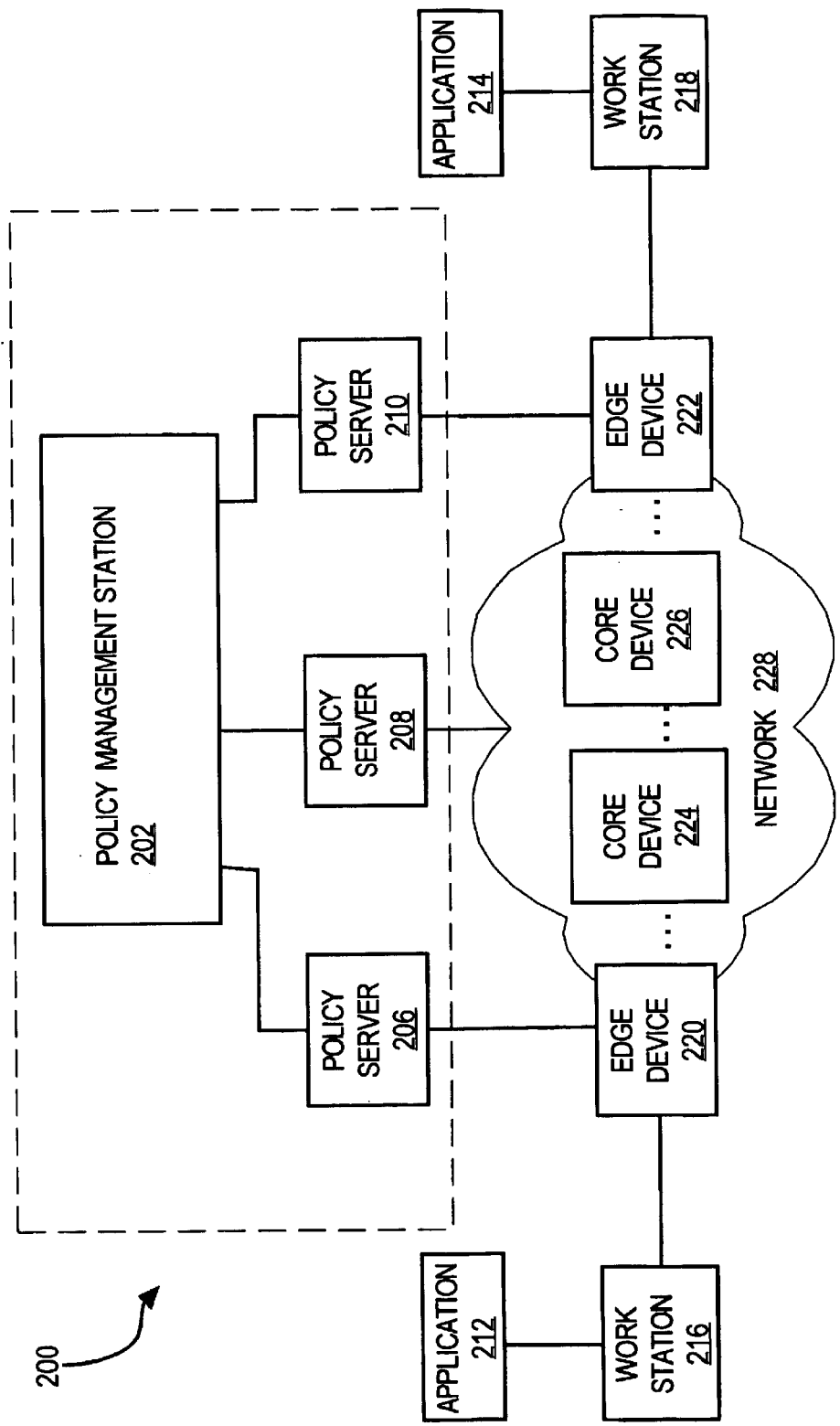
FIG. 2 is a block diagram of a computer network in which in which the present invention may be utilized.

FIG. 2 is a block diagram of a computer network 200 illustrating certain elements of an embodiment. Generally, computer network 200 includes one or more network devices 220, 222, 224, 226 a plurality of workstations 216, 218, a policy management station 202 and a network 228.

Network devices 220, 222 represent edge network devices such as routers, switches, or other similar or equivalent devices that are configured for coloring packets within network 228. In one embodiment, network devices 220, 222 are configured to execute the Cisco Internetworking Operating System (IOS) and are capable of marking packets with DSCP values, i.e., they are compatible with Differentiated Services. Such marking may be carried out using a marker or other software element or application that runs under control of IOS, e.g., an agent or process. Network devices 224, 226 represent internal network devices such as routers, switches, or other similar or equivalent devices that are configured for forwarding packets within network 228 based the color of each packet. In certain embodiments, network devices 224, 226 are configured to execute the Cisco Internetworking Operating System (IOS) and are capable of forwarding packets based on their DSCP values, i.e., they are compatible with Differentiated Services. It should be noted that network devices 220, 222 and network devices 224, 226 may in fact represent similar or even identical device types and/or models that are each configured to perform a designated function within computer network 200.

Workstations 216, 218 may be personal computers, workstations, or other network end stations at which work is done, such as printers, scanners, facsimile machines, etc. In certain embodiments, workstations 216, 218 may themselves be network devices, such as bridges, gateways, routers or switches that allow computer network 200 to connect to another network system. For example, workstation 216 may be an edge device that is configured for coloring packet of a different DS domain. In certain embodiments, workstations 216, 218 execute one or more applications 212, 214.

Applications 212, 214 may represent a variety of different computer applications that execute on workstations 216, 218 respectively and which cause data to be sent and received over network 228.

Network 228 is a network system comprising any number of network devices. Network 228 may form part of a LAN or WAN. In one embodiment, network 206 is a packet-switched IP network configured as a DS domain whereby treatment of packets that flow through network 228 is controlled and managed by Policy Management Station 202 and network devices 220, 222, 224, 226.

Policy Management Station 202 is a computer, or a group of hardware or software components or processes that cooperate or execute in one or more computer systems. In this example, Policy Management Station 202 includes one or more policy servers 206, 208, 210, that are coupled to network devices 220, 222, 224, 226. In one embodiment, a policy coordinator communicates with policy servers 206, 208, 210 to configure the network devices 220, 222, 224, 226, to control the coloring and forwarding of packets within network 228. For example, the policy coordinator may direct network devices 220, 222 to color the packets of all Voice Over IP (VOIP) flows with the color gold (high priority) and to color the packets of all File Transfer Protocol (FTP) flows with the color Bronze (low priority). Each color corresponds to a particular service level and is associated with one or more QOS treatment parameters, e.g., a pre-defined DSCP value and possibly other values or characteristics. The policy coordinator may further direct network devices 224, 226 to apply a particular forwarding policy based on the particular color of each packet that is processed.

In one embodiment, Policy Management Station 202 provides a mechanism whereby a network administrator may select or define a desired service level that is to be applied to a particular group of data flows within network 206. For example, an administrator may choose to have a service level of Gold be applied to all VOIP flows within computer network 200. In response, the policy coordinator communicates with the policy servers to cause edge devices 220, 222 to set an initial DSCP value in the packets of all VOIP flows. An example of a commercial product suitable for use as Policy Management Station 208 is CiscoAssure QoS Policy Manager 1.0, commercially available from Cisco Systems, Inc.

Although the example embodiment of FIG. 2 shows two (2) workstations 216, 218, three (3) policy servers 216, 208, 210, two (2) edge devices 220, 222, and two (2) internal devices 224, 226, in other practical embodiments there may be any number of such elements. In addition, Policy Management Station 202 is provided as only an example of one type configuration that may be used to manage QoS policies. Thus, as understood by those in the art, Policy Management Station 202 may be configured as a single component or instead variety of different distributed components that are configured for implementing adaptive QoS policies to maintain the level of service that is required by the service levels within a network.

Automatically Providing a Bi-directional Guarantee of Quality of Service Treatment Using Differentiated Services In an embodiment, one or more network devices can determine how to color return traffic of a flow based on the DSCP setting of the flow itself, in addition to any other parameters that are then currently used by the devices to make such a determination. This approach provides an automated QoS guarantee for both directions of a bi-directional flow, and requires setting a DSCP value in conventional manner only for one direction of the flow.

Figure 3A:
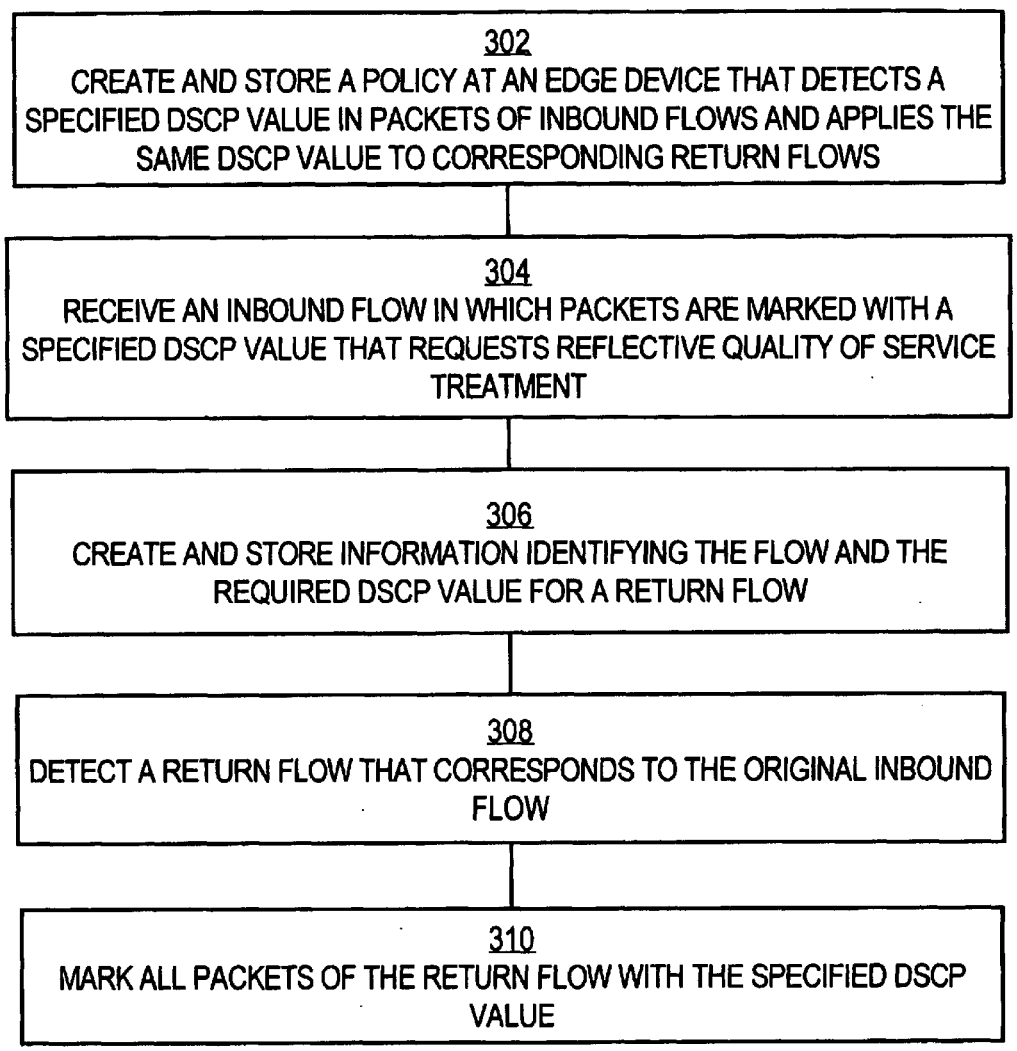
FIG. 3A is a flow diagram of one aspect of a process of automatically establishing bi-directional differentiated services treatment of flows in a network.

FIG. 3A is a flow diagram of one aspect of a process of automatically establishing bi-directional differentiated services treatment of flows in a network.

In block 302, a quality of service policy is created and stored in association with an edge device such that a specified DSCP reflective signaling value in packets of inbound flows is detected, and the same DSCP value is applied to corresponding return flows. In one embodiment, block 302 involves creating and storing a policy at a policy decision point that is associated with or that manages an edge device such as a router at the edge of a network. The policy decision point may be, for example, Cisco QoS Policy Manager, which is commercially available from Cisco Systems, Inc., San Jose, Calif.

A reflective DSCP feature may be configured on edge devices 220, 222 in several ways. In one approach, the incoming DSCP value is specified along with the DSCP value that should be sent reflected. This can be augmented by specifying that reflection should be done only for packets coming from a specific subnet, or any other additional restrictions of the set of flows being reflected.

Packets arriving from core devices 224, 226 have an implied level of trust. Thus, if a policy enforcement point receives a DSCP marked packet coming from a core device, the packet is trusted because it must have passed boundary checking before arriving at the core device. Therefore, the policy enforcement point can properly base a decision to mark the return traffic on it.

Block 302 also may involve mapping several DSCP values to a single DSCP value on the return traffic. For example, standard assured forwarding service may mark packets of the same flow with several DSCP values. This may occur, for example, when a policy rule enforced on an edge device of the network determines that the rate of a flow exceeds the allowed rate and therefore marks all packets of the flow that exceed the allowed rate with a different DSCP value, to indicate that such packets have a higher drop precedence. The return traffic is not concerned with whether the incoming traffic exceeded the allowed rate, and therefore the device can mark all return traffic with the appropriate lower drop precedence DSCP value.

In block 304, an inbound flow is received, in which packets are marked with a specified DSCP value that match the configuration for reflective DSCP on the other edge. For example, an inbound flow is received that has the DSCP marking of "17" using the approach outlined above. Block 304 may occur immediately after block 302 or after a long time interval. Block 304 may involve receiving a flow at a policy server or other policy decision point, or receiving a flow at a router or other policy enforcement point.

In block 306, information identifying the flow, and the required DSCP value for a return flow, is created and stored. For example, block 306 involves creating and storing a five-tuple of values that uniquely identify a flow, including source IP address, destination IP address, source port number, destination port number, and an IP protocol identifier. This enables the process to distinguish among multiple flows sent from a single end node. This is important when different applications running on the same end host need to receive different QoS guarantees, in particular when the end node is a firewall or network address translation (NAT) device that exposes only one IP address to external devices but acts on behalf of a whole network.

The five-tuple is stored in association with the DSCP value that is required to apply to the return flow. In one embodiment involving a Cisco switch, this information is stored in the flow table of the edge switch; the table may be modified by adding a column that stores the DSCP value or a flag indicating that reflection is set. Alternatively, the information may be stored in the Network-Based Application Recognition (NBAR) table, which is a table of application flows that need a particular kind of QoS treatment, in a new column that indicates reflection.

Thus, block 302 may involve setting up one or more static policies at a server or at a switch that is connected to a server. The static policy specifies that the policy enforcement point should look at the DSCP value of particular inbound packets and apply the same or different specified value to return traffic in the same flow. Block 306 may involve creation of one or more dynamic policy entries to set the appropriate DSCP to the return traffic.

In another embodiment, a device associated with traffic originated by "John Smith" marks outbound traffic with the DSCP value of "17" Further, a policy is created and stored at the edge devices, such that when DSCP 17 is marked in packets of a flow, all return traffic corresponding to that flow is also marked with the same DSCP value. As a result, there is no need to add additional marking policies on edge routers; the return traffic is automatically marked by edge devices to "17" only when "John Smith" initiated flows passing through such devices, and a bi-directional QoS guarantee is achieved.

In still another alternative for block 306, a static policy is created and stored at a policy server that indicates what QoS treatment to apply to return traffic for a particular flow.

In block 308, a return flow that corresponds to the original inbound flow is detected, and in block 310 all packets of the return flow are marked with the specified DSCP value. In one embodiment, block 308 and block 310 are carried out only at a switch; that is, only a switch device at a network edge point marks return traffic.

The value that is marked at block 310 may be different from the value detected in block 304. For example, block 304 may involve detecting the value "17" and block 310 may involve marking with the value "18" or some other value that is associated in some way with the detected specified value.

Return traffic is defined as one or more packets that are sent from the receiver of a flow back to the sender in response to or in association with the information carried in the original flow. In one embodiment, return traffic is identified by determining whether a flow contains origination IP address and destination IP address values that are opposite to or complementary with the addresses of the original flow. In another embodiment, return traffic is identified by determining whether a flow contains origination port address and destination port address values that are opposite to or complementary with the addresses of the original flow as well.

In one embodiment, an edge device is responsible to classify and police traffic from untrusted sources, and forward such traffic to the trusted QoS domain. The edge device is also responsible to forward traffic received from the trusted domain to its destination outside the trust boundary. Traffic that is received from the trusted domain is already classified and adheres to the QoS policies that are set within the domain. Accordingly, an edge device can trust the DSCP value carried in flows coming from the trusted domain, instructing it to deliver QoS to the return traffic.

In such an embodiment, edge devices are configured, on a per port basis, whether to trust the DSCP value of incoming traffic, or whether to override the DSCP value by remarking the traffic as Best Effort. In one embodiment, the reflective DSCP setting feature is enabled on a device by specifying a reflective DSCP value or a set of reflective DSCP values and the corresponding DSCP value that should be marked on the return traffic. In response, a device monitors all traffic forwarded from the trusted QoS domain outside of the trust boundary, i.e. sent via interfaces with un-trusted configurations, that carry one of the configured reflective DSCPs, and pre-prepare classification rules for the return traffic setting the return DSCP value. This embodiment assumes that the return traffic is sent using the same interface or device as the original flow. This is true in most enterprise environments in which the edge device is a switch that is directly connected to the senders and receivers.

A mechanism is provided that removes the classification rules for return traffic when the original flow either ends or its DSCP setting is changed. For example, in certain embodiments, the process of FIG. 3A further includes the steps of identifying an end of the originating packet flow, and removing the stored information that identifies the originating packet flow and a second DSCP value for marking the return packet flow. Thus, flow data is deleted from memory when it is no longer needed, thereby freeing up space for new flows. A more elaborate configuration of this feature can be used to fine-tune the DSCP setting according to other network attributes and to specify policer values on return traffic.

The process of FIG. 3A represents only one example implementation of reflective DSCP marking; other mechanisms may be implemented at a core device or edge device to Tesult in the same functionality. For example, embodiments are not required to always mark with a specified second DSCP value in response to detecting a flow that is marked using a specified first DSCP value. Multiple different marking values may be applied to packets at any point in the return path of the packet in response to detecting a particular marking value in the packet in an originating flow.

Any of the foregoing embodiments also may be implemented on end device routers or other end station hosts.

The DS field is defined also for version 6 of the Internet Protocol (IPv6). The foregoing embodiments may be used with IPv6 by storing reflective DSCP rules for IPv6 on edge devices or end nodes.

In addition, embodiments are not limited to the context of packet data transmission using IP networks such as the Internet. Embodiments can be used in the context of wireless packet-based communication, e.g., using the GPRS and 3G protocols.

A plurality of means of signaling the use of reflective DSCP settings are contemplated and the following section presents one example of a possible means for signaling the use of such settings.

Figure 3B:
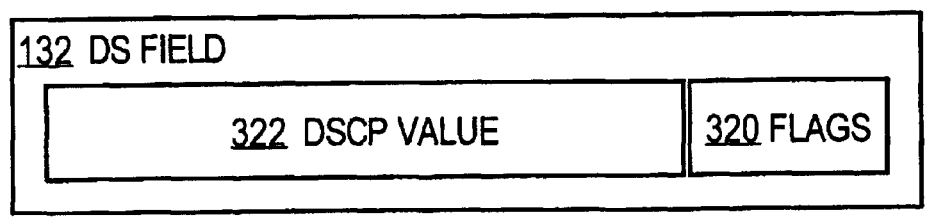
FIG. 3B is a block diagram of a Type Of Service byte in an IP header of a packet.

As described above, the IP packet header includes an 8-bit TOS byte, which may comprise an octet of Differentiated Services values. In present standards, 6 bits of the DS field are reserved for carrying a DSCP value, and the remaining 2 bits are reserved for use in future protocols, but are presently undefined. FIG. 3B is a block diagram of a Differentiated Services field that may be used in this approach. DS Field 132, which is structured as an 8-bit octet, comprises a flags 320 that are 2 bits in length and a DSCP value 322 that occupies 6 bits.

In one example embodiment, the use of reflective DSCP is signaled by selecting a DSCP value on the originating side of the transmission such that the value inherently Tequests return traffic to have another specified QoS value. For example, DSCP value 322 may have a value of "16" that might indicate that Bronze quality of service treatment is applied, and the companion value "17" might indicate that Bronze quality of service treatment is applied with reflective treatment for return traffic of the same flow. Thus, by marking packets of an originating flow with DSCP="17", a client could indicate that edge switches should mark return traffic packets with DSCP="16".

Each edge device also may be configured with one or more other policies in addition to the automatically generated policies. Accordingly, in one embodiment, the precedence of the configured policies, compared to the automatically configured ones, is established by setting a precedence value. Thus, the priority of automatically generated policies that implement reflective DSCP is configurable with respect to the other policies.

In all such embodiments, although the originating client may request marking with reflection, in all cases it is expected that the server-side switch controls whether reflection is actually enforced.

Hardware Overview

Figure 4:
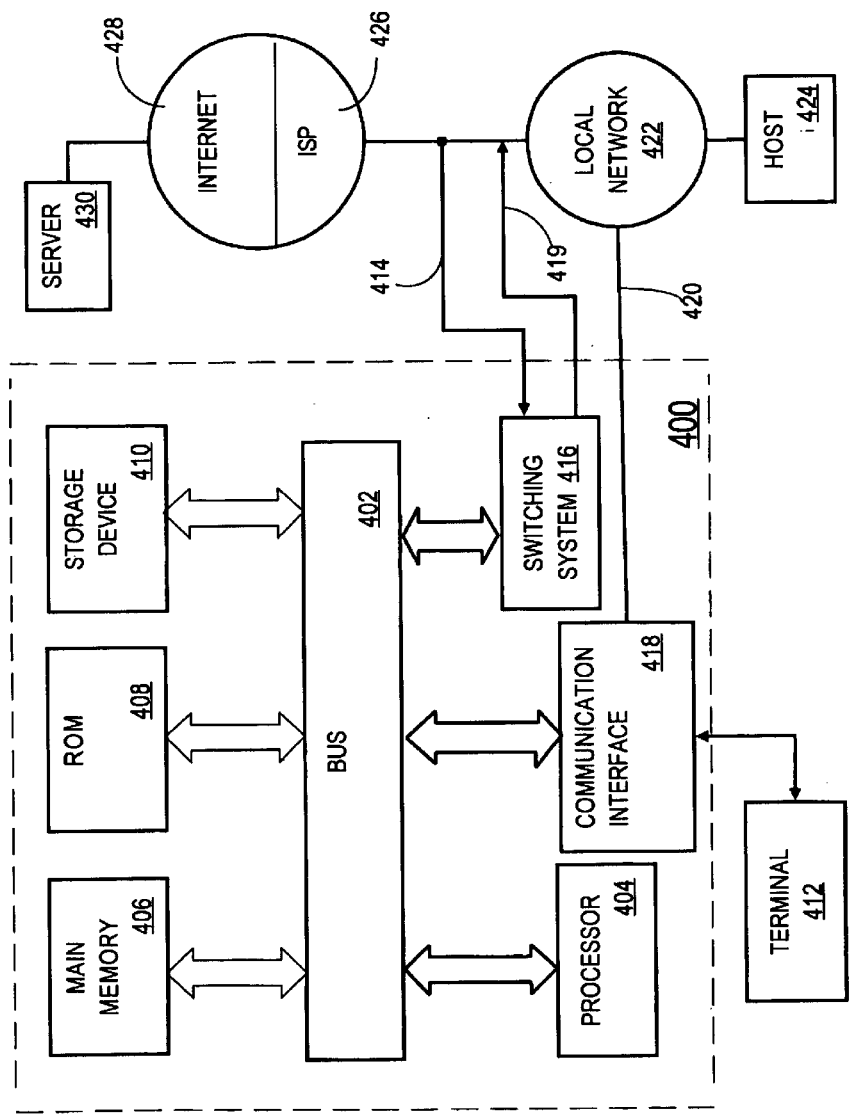
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for automatically establishing bi-directional differentiated services treatment of flows in a network. According to one embodiment of the invention, automatically establishing bi-directional differentiated services treatment of flows in a network are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for automatically establishing bi-directional differentiated services treatment of flows in a network.

The received code may be executed by processor 404 as it is received, and/or stored in storage device 410, or other non-volatile storage for later execution. In this manner, computer system 400 may obtain application code in the form of a carrier wave.

Extensions and Variations

Accordingly, a method for automatically establishing bi-directional differentiated services treatment of flows in a network is disclosed. In one embodiment, a method automatically applies bi-directional quality of service treatment under the Differentiated services model to packet flows of voice information that are transmitted among a pair of endpoint nodes in a packet-switched network. Using the disclosed embodiments, policy setting to arrive at a bi-directional QoS guarantee is greatly simplified. Further, classification and policing resources are consumed only in the network nodes that are actually visited by traffic that requires a bi-directional QoS guarantee. The disclosed methods are efficient and scalable, compared to prior approaches that involve setting policy rules for return traffic on all nodes. In addition, the disclosed methods do not require the topology knowledge that is involved in other approaches.

In the foregoing specification, the invention is described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of automatically establishing differentiated services quality of service treatment for a return packet flow that is associated with an originating packet flow in a network, the method comprising the computer-implemented steps of:
   receiving the originating packet flow;
   determining that one or more packets in the originating packet flow are marked with a DSCP value that matches a policy rule that requires setting a specified DSCP value in the return packet flow;
   creating and storing information identifying the originating packet flow and a second DSCP value for marking the return packet flow;
   receiving the return packet flow and determining that it is associated with the originating packet flow;
   marking packets of the return packet flow with the second DSCP value.

2. A method as recited in claim 1, wherein the information identifying the originating packet flow and the second DSCP value are created and stored in a flow table of a network switch that is acting as a policy enforcement point.

3. A method as recited in claim 1, wherein the information identifying the originating packet flow and the second DSCP value are created and stored in a network-based application recognition table of a network switch that is acting as a policy enforcement point.

4. A method as recited in claim 1, further comprising the steps of:
   identifying an end of the originating packet flow;
   removing the stored information that identifies the originating packet flow and a second DSCP value for marking the return packet flow.

5. A method as recited in claim 1, wherein the steps are carried out at a switch device that is logically located at an edge point of a network.

6. A method as recited in claim 1, wherein creating and storing information comprises creating and storing a static policy at a policy server, wherein the static policy specifies applying the second DSCP value to the return packet flow.

7. A computer-readable medium carrying one or more sequences of instructions for automatically establishing differentiated services quality of service treatment for a return packet flow that is associated with an originating packet flow in a network, which instructions, when executed by one or more processors, cause the one or more processors to carry out the steps of:
   receiving the originating packet flow;
   determining that one or more packets in the originating packet flow are marked with a DSCP value that matches a policy rule that requires setting a specified DSCP value in the return packet flow;
   creating and storing information identifying the originating packet flow and a second DSCP value for marking the return packet flow;
   receiving the return packet flow and determining that it is associated with the originating packet flow;
   marking packets of the return packet flow with the second DSCP value.

8. A computer-readable medium as recited in claim 7, wherein the information identifying the originating packet flow and the second DSCP value are created and stored in a flow table of a network switch that is acting as a policy enforcement point.

9. A computer-readable medium as recited in claim 7, wherein the information identifying the originating packet flow and the second DSCP value are created and stored in a network-based application recognition table of a network switch that is acting as a policy enforcement point.

10. A computer-readable medium as recited in claim 7, wherein the steps are carried out at a switch device that is logically located at an edge point of a network.

11. A computer-readable medium as recited in claim 7, wherein creating and storing information comprises creating and storing a static policy at a policy server, wherein the static policy specifies applying the second DSCP value to the return packet flow.

12. A computer-readable medium as recited in claim 7, further comprising instructions for carrying out the steps of:
   identifying an end of the originating packet flow;
   removing the stored information that identifies the originating packet flow and a second DSCP value for marking the return packet flow.

13. An apparatus that can automatically establishing differentiated services quality of service treatment for a return packet flow that is associated with an originating packet flow in a network, comprising:
   means for receiving the originating packet flow;
   means for determining that one or more packets in the originating packet flow are marked with a first DSCP value that includes a request for application of the same quality of service treatment to the return packet flow;
   means for creating and storing information identifying the originating packet flow and a second DSCP value for marking the return packet flow;
   means for receiving the return packet flow and determining that it is associated with the originating packet flow;
   means for marking packets of the return packet flow with the second DSCP value.

14. An apparatus as recited in claim 13, wherein the information identifying the originating packet flow and the second DSCP value are created and stored in a flow table of a network switch that is acting as a policy enforcement point.

15. An apparatus as recited in claim 13, wherein the information identifying the originating packet flow and the second DSCP value are created and stored in a network-based application recognition table of a network switch that is acting as a policy enforcement point.

16. An apparatus as recited in claim 13, wherein the first DSCP value that includes a request for application of the same quality of service treatment to the return packet flow has a value that is one unit greater than the second DSCP value.

17. An apparatus as recited in claim 13, wherein the steps are carried out at a switch device that is logically located at an edge point of a network.

18. An apparatus as recited in claim 13, wherein the means for creating and storing information comprises a means for creating and storing a static policy at a policy server, wherein the static policy specifies applying the second DSCP value to the return packet flow.

19. An apparatus as recited in claim 13, further comprising:
   means for identifying an end of the originating packet flow;
   means for removing the stored information that identifies the originating packet flow and a second DSCP value for marking the return packet flow.

20. An apparatus for automatically establishing differentiated services quality of service treatment for a return packet flow that is associated with an originating packet flow in a network, comprising:
   a network interface that is coupled to the data network for receiving one or more packet flows therefrom;
   a processor;
   one or more stored sequences of instructions which, when executed by the processor, cause the processor to carry out the steps of:
      receiving the originating packet flow;
      determining that one or more packets in the originating packet flow are marked with a DSCP value that matches a policy rule that requires setting a specified DSCP value in the return packet flow;
      creating and storing information identifying the originating packet flow and a second DSCP value for marking the return packet flow;
      receiving the return packet flow and determining that it is associated with the originating packet flow;
      marking packets of the return packet flow with the second DSCP value.

21. An apparatus as recited in claims 20, wherein the information identifying the originating packet flow and the second DSCP value are created and stored in a flow table of a network switch that is acting as a policy enforcement point.

22. An apparatus as recited in claim 20, wherein the information identifying the originating packet flow and the second DSCP value are created and stored in a network-based application recognition table of a network switch that is acting as a policy enforcement point.

23. An apparatus as recited in claim 20, wherein the steps are carried out at a switch device that is logically located at an edge point of a network.

24. An apparatus as recited in claim 20, wherein creating and storing information comprises creating and storing a static policy at a policy server, wherein the static policy specifies applying the second DSCP value to the return packet flow.

25. An apparatus as recited in claims 20, comprising further stored sequences of instructions which, when executed by the processor, cause the processor to carry out the steps of:
   identifying an end of the originating packet flow;
   removing the stored information that identifies the originating packet flow and a second DSCP value for marking the return packet flow.

26. A method of providing a selective automatic bi-directional differentiated services quality of service treatment guarantee for a return packet flow that is associated with an originating packet flow in a network, the method comprising the computer-implemented steps of:
   creating and storing a first Differentiated Services Codepoint (DSCP) value and a second DSCP value that are both associated with the same per-hop-behavior (PHB) treatment at core network devices but are each associated with a different reflective DSCP setting;
   receiving the originating packet flow;
   receiving the return packet flow and determining that it is associated with the originating packet flow;
   when one or more packets in the originating packet flow are marked with the first DSCP value, marking packets of the return packet flow with the second DSCP value; and
   when one or more packets in the originating packet flow are marked with the second DSCP value, passing packets of the return packet flow without modification of DSCP values in such packets.

27. A method as recited in claim 26, wherein marking packets of the return packet flow is carried out only when the originating packet flow originates from a trusted interface.

28. A method as recited in claim 1, wherein marking packets of the return packet flow is carried out only when the originating packet flow originates from a trusted interface.

29. A method as recited in claim 1, wherein the steps of marking packets of the return packet flow with the second DSCP value comprises the steps of marking packets of the return packet flow with the second DSCP value only when the originating packet flow originates from a trusted interface.

* * * * *

UNITED STATES PATENT AND TRADEMARK OFFICE
CERTIFICATE OF CORRECTION

| | | |
|---|---|---|
| PATENT NO. | : 7,050,396 B1 | Page 1 of 1 |
| APPLICATION NO. | : 09/729623 | |
| DATED | : May 23, 2006 | |
| INVENTOR(S) | : Ron Cohen et al. | |

It is certified that error appears in the above-identified patent and that said Letters Patent is hereby corrected as shown below:

Title Page, Item (56) References cited

Please insert
--5,751,964   5-12-1998   Ordanic et al.
  6,788,647   9-2004      Mohaban et al.
  6,822,940   11-2004     Zavalkovsky et al.
  6,865,153   3-2005      Hill et al.         --

Title Page, Item (56) Other Publications, insert

--S. Blake, et al., "An Architecture for Differentiated Services," December 1998, Network Working Group, Request for Comments: 2475, pages 1-36.

D. Durham, et al., "The COPS (Common Open Policy Service) Protocol," January 2000, Network Working Group, Request for Comments: 2748, http:www.ietf.org/rfc/rfc2748.txt?number=2748, data retrieved 8/14/2004, pages 1-38.

S. Herzog, et al., "COPS usage for RSVP," January 2000, Network Working Group, Request for Comments: 2749, http://www.ietf.org/rfc/rfc2749.txt?number=2749, data retrieved 8/14/2004, pages 1-16.

R. Braden, et al., "Resource ReSerVation Protocol (RSVP) - Version 1 Functional Specification," September 1997, http://www.ietf.org/rfc/rfc2205.txt.?number=2205, data retrieved 9/19/03, pages 1-105. --

Signed and Sealed this

Twenty-sixth Day of June, 2007

JON W. DUDAS
*Director of the United States Patent and Trademark Office*